United States Patent
Martin et al.

(10) Patent No.: US 7,942,278 B2
(45) Date of Patent: May 17, 2011

(54) BAKING RACK FOR CHICKENS AND OTHER FOWL

(75) Inventors: Stephanie J. Martin, Milton, VT (US); Timothy G. Klauder, Wesley Chapel, FL (US); Raoul T. Cervantes, Waterbury, VT (US); Jiri Rabas, Lynnwood, WA (US); Roberto Guarino, Toronto (CA)

(73) Assignee: G.S. Blodgett Corporation, Burlington, VT (US)

( * ) Notice: Subject to any disclaimer, the term of this patent is extended or adjusted under 35 U.S.C. 154(b) by 26 days.

(21) Appl. No.: 12/567,270

(22) Filed: Sep. 25, 2009

(65) Prior Publication Data

US 2011/0017687 A1     Jan. 27, 2011

Related U.S. Application Data

(60) Provisional application No. 61/228,363, filed on Jul. 24, 2009.

(51) Int. Cl.
*B42F 13/12* (2006.01)
(52) U.S. Cl. .................................. 211/125; 211/181.1
(58) Field of Classification Search .............. 211/41.4, 211/125, 181.1, 182; 99/426, 446, 449, 450, 99/419; 220/752, 573.1
See application file for complete search history.

(56) References Cited

U.S. PATENT DOCUMENTS

| 1,344,915 A * | 6/1920 | Love ............................ 99/421 V |
| 2,550,355 A * | 4/1951 | James ............................... 211/74 |
| 2,841,288 A * | 7/1958 | Field et al. ...................... 211/41.4 |
| 3,032,203 A * | 5/1962 | Romero ........................ 211/41.4 |
| 3,050,073 A * | 8/1962 | McMillan ....................... 134/137 |
| 3,322,060 A * | 5/1967 | Gilbert .......................... 99/421 R |
| 3,800,958 A * | 4/1974 | Dorn ............................... 211/43 |
| 3,986,445 A | 10/1976 | Hooton |
| 4,127,060 A | 11/1978 | Curtis |
| 4,421,017 A | 12/1983 | Ross |
| 4,450,759 A | 5/1984 | Steibel |
| 4,633,773 A | 1/1987 | Jay |
| 4,715,273 A | 12/1987 | Riesselmann |
| 4,750,414 A | 6/1988 | Dohrs |

(Continued)

OTHER PUBLICATIONS

Internet printout, Rational Superspike (1 page) printed Apr. 9, 2010, available at http://www.rational-online.com/CA_en/products/accessories/chicken-and-duck-superspike.

(Continued)

*Primary Examiner* — Korie Chan
(74) *Attorney, Agent, or Firm* — Brinks Hofer Gilson & Lione

(57) ABSTRACT

A baking rack is provided. The rack includes a plurality of relatively straight wires that are each disposed in parallel to each other and an outer wire establishing a perimeter of the rack and extending along opposing ends of the plurality of wires, the straight wires and the outer wire are each disposed within a plane. A plurality of height stabilizing members are connected to two or more of the straight wires or the outer wire, such that the plane is disposed above a surface upon which bottom portions of the height stabilizing members rest. A plurality of upstanding members extend from the plane, the upstanding members each connected to one or more of the straight wires and the outer wire, the upstanding members each comprising an arched portion and an upstanding stick, wherein a second plane is disposed through the arched portion of each upstanding member is at an acute angle with a line parallel to the straight wires.

14 Claims, 8 Drawing Sheets

U.S. PATENT DOCUMENTS

| | | | |
|---|---|---|---|
| 4,848,217 A | 7/1989 | Koziol | |
| 4,924,768 A | 5/1990 | Jay | |
| 5,069,117 A | 12/1991 | Schlessel | |
| 5,106,642 A | 4/1992 | Ciofalo | |
| 5,442,999 A | 8/1995 | Meister | |
| 5,842,409 A | 12/1998 | Loffler | |
| 6,119,588 A * | 9/2000 | Tiemann | 99/426 |
| 6,595,120 B1 * | 7/2003 | Tiemann | 99/426 |
| 6,952,991 B2 * | 10/2005 | Siegel et al. | 99/426 |
| 7,565,863 B2 * | 7/2009 | Tschetter et al. | 99/419 |
| 2009/0049995 A1 * | 2/2009 | St. Laurent et al. | 99/419 |

OTHER PUBLICATIONS

Blodgett Combi Price List, dated Dec. 1, 1995 (2 pages).
Blodgett Combi Price List, dated Jan. 1, 1995 (2 pages).

* cited by examiner

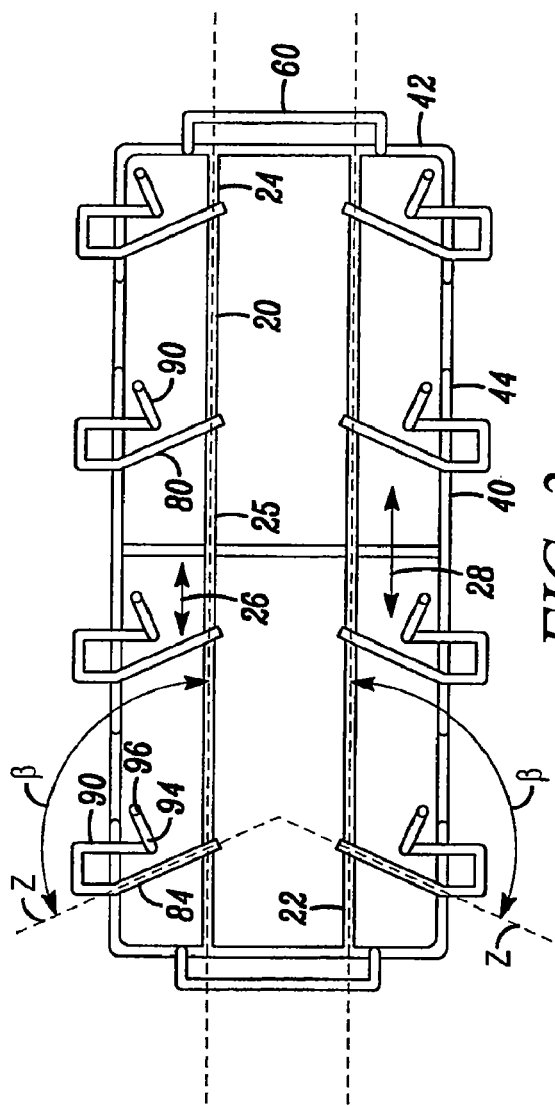
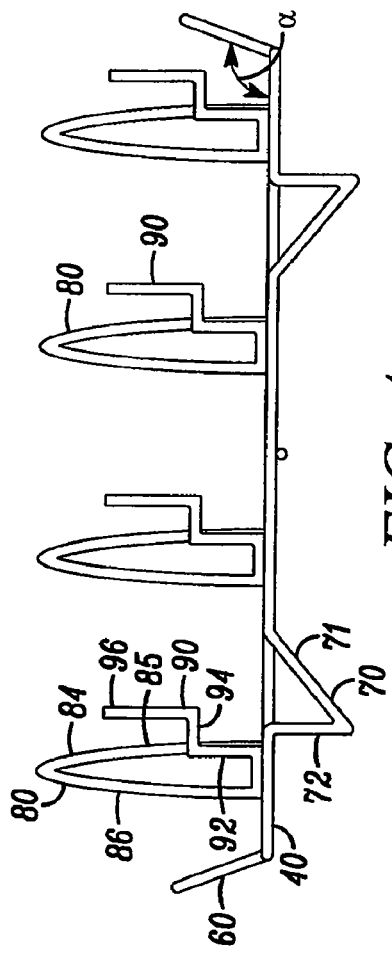
FIG. 3
FIG. 4

BAKING RACK FOR CHICKENS AND OTHER FOWL

CROSS-REFERENCE TO RELATED APPLICATION

This application claims priority under 35 U.S.C. §119(e) to U.S. Provisional Application No. 61/228,363, filed on Jul. 24, 2009, the entirety of which is fully incorporated by reference herein.

TECHNICAL FIELD

The subject disclosure relates to devices to simultaneously bake numerous whole chickens or other types of fowl.

BRIEF SUMMARY

A first representative embodiment of the disclosure provides a baking rack. The baking rack includes a plurality of straight wires disposed in a substantially planar manner at spaced intervals therebetween and an outer wire disposed around a perimeter established by opposite ends of the plurality of straight wires. A plurality of height stabilizing members are connected to two or more of the straight wires or the outer wire, such that a plane extending through each of the straight wires and the outer wire is disposed above a surface upon which bottom ends of the height stabilizing member rest. First and second handles are disposed upon the outer wire proximate to opposite ends of the straight wires. A plurality of upstanding members disposed upon the straight wires that are configured to extend into the cavity of a fowl placed thereon. The outer wire is configured to just fit within and contact inner surfaces of each of side walls defining a conventional hotel pan.

A second representative embodiment of the disclosure provides a baking rack configured to hold a plurality of upstanding fowl. The baking rack includes a plurality of relatively straight wires each disposed in parallel to each other and an outer wire establishing a perimeter of the rack and extending along opposing ends of the plurality of wires, the straight wires and the outer wire each disposed within a plane. A plurality of height stabilizing members are connected to two or more of the straight wires or the outer wire, such that the plane is disposed above a surface upon which bottom portions of the height stabilizing members rest. A plurality of upstanding members extend from the plane and the upstanding members are each connected to one or more of the straight wires and the outer wire. The upstanding members each comprise an arched portion and an upstanding stick, wherein a second plane disposed through the arched portion of each upstanding member is at an acute angle with a line parallel to the straight wires.

A third representative embodiment baking rack. The baking rack includes a plurality of straight wires disposed in a substantially planar manner at spaced intervals therebetween and an outer wire disposed around a perimeter established by opposite ends of the plurality of straight wires. A plurality of height stabilizing members are defined by the straight wires or the outer wire, with the straight wire or outer wire being bent to extend below a plane through the straight wires to provide a vertical set off between the plane and the surface that the rack rests upon. First and second handles are disposed upon the outer wire proximate to opposite ends of the straight wires. A plurality of upstanding members disposed upon the straight wires that are configured to extend into the cavity of a fowl placed thereon. The outer wire is configured to just fit within and contact inner surfaces of each of side walls defining a conventional hotel pan.

Advantages of the disclosed rack of use will become more apparent to those skilled in the art from the following description of embodiments that have been shown and described by way of illustration. As will be realized, other and different embodiments are contemplated, and the disclosed details are capable of modification in various respects. Accordingly, the drawings and description are to be regarded as illustrative in nature and not as restrictive.

BRIEF DESCRIPTION OF THE DRAWINGS

FIG. 3 is a top view of the rack of FIG. 1.

FIG. 4 is a side view of the rack of FIG. 1.

DETAILED DESCRIPTION

Figure 1:
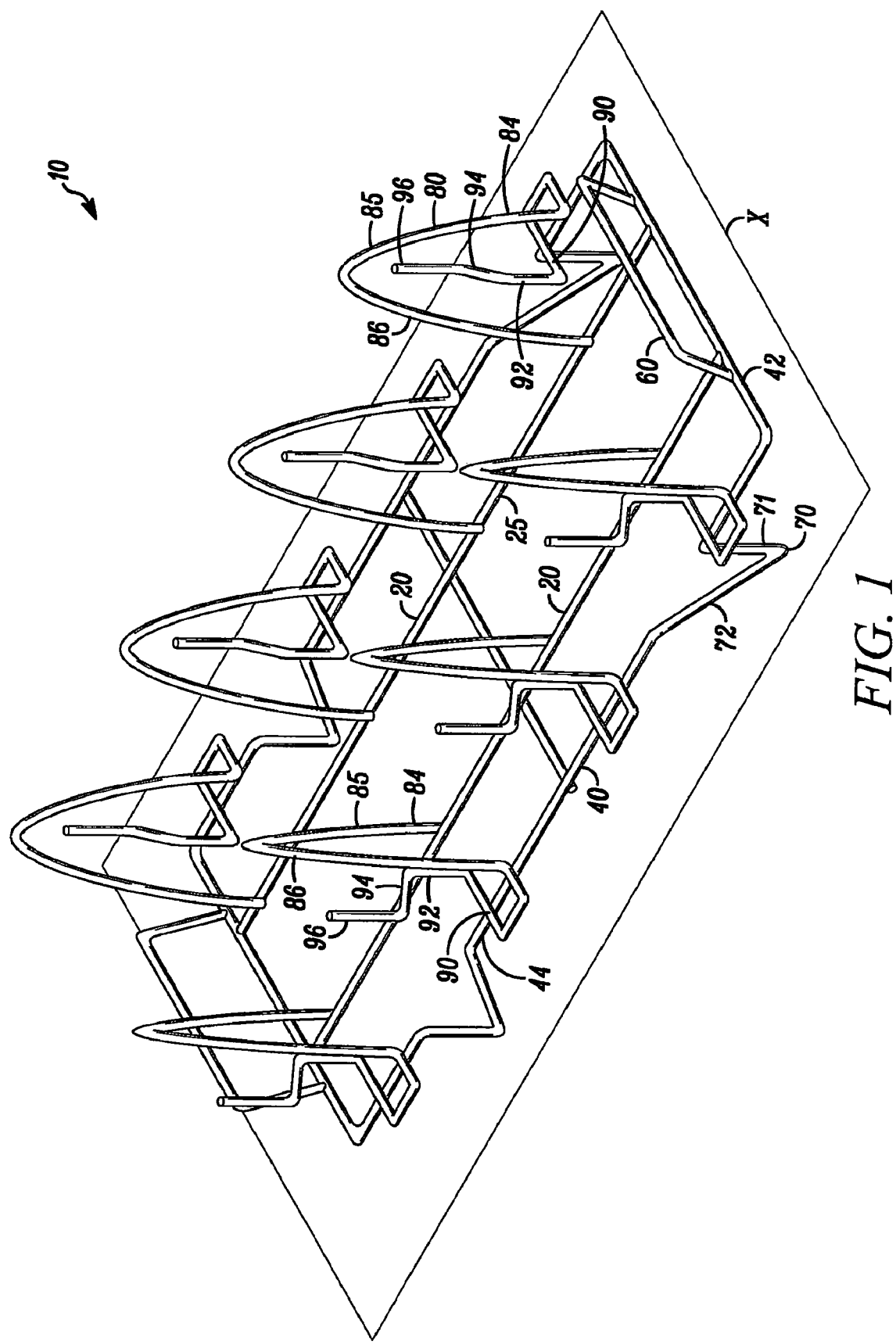
FIG. 1 is a perspective view of a baking rack configured to hold a plurality of chickens or other fowl.

Turning now to FIGS. 1-7, a baking rack 10 for supporting a plurality of chickens, turkeys, or other fowl is provided. While the rack 10 is configured to support many types of fowl, they will collectively be referred to hereinafter as chicken for the sake of brevity. The rack 10 includes a planar horizontal grid that is formed from two or more horizontal wires 20 and an outer wire 40 that extends around and defines the perimeter of the horizontal grid, with the plurality of horizontal wires 20 and the majority of the outer wire 40 lying within a single horizontal plane X (FIG. 1). The first portions 42 of the outer wire 40 that contact and extend perpendicularly to the respective distal ends 22 and proximal ends 24 of each of the horizontal wires 20, and the side wires 44 of the outer wire 40 extend in parallel to the horizontal wires 20 and establish the width of the rack 10.

In some embodiments as shown in FIGS. 2 and 5-7, the rack 10 is configured to rest within a conventionally sized hotel pan that is approximately 12 inches wide, 20 inches long, and 2.5 inches deep. In a representative embodiment, the rack 10 is 7⅞ inches wide, 18⅞ inches long, and includes a plurality of height stabilizing members 70 (discussed in detail below) that extend 1⅞ inches below the bottom surface of the plurality of wires 20. Because the width of the rack 10 is about 4 inches less than the width of the conventional hotel pan, a space of about 2 inches per side of the rack 10 overhang is provided within the rack 10 (FIG. 2) that allows chickens placed upon the upstanding members 80 to be positioned within and overhanging the bottom surface of the pan 2 to collect any drippings from the chicken during baking.

Figure 8:
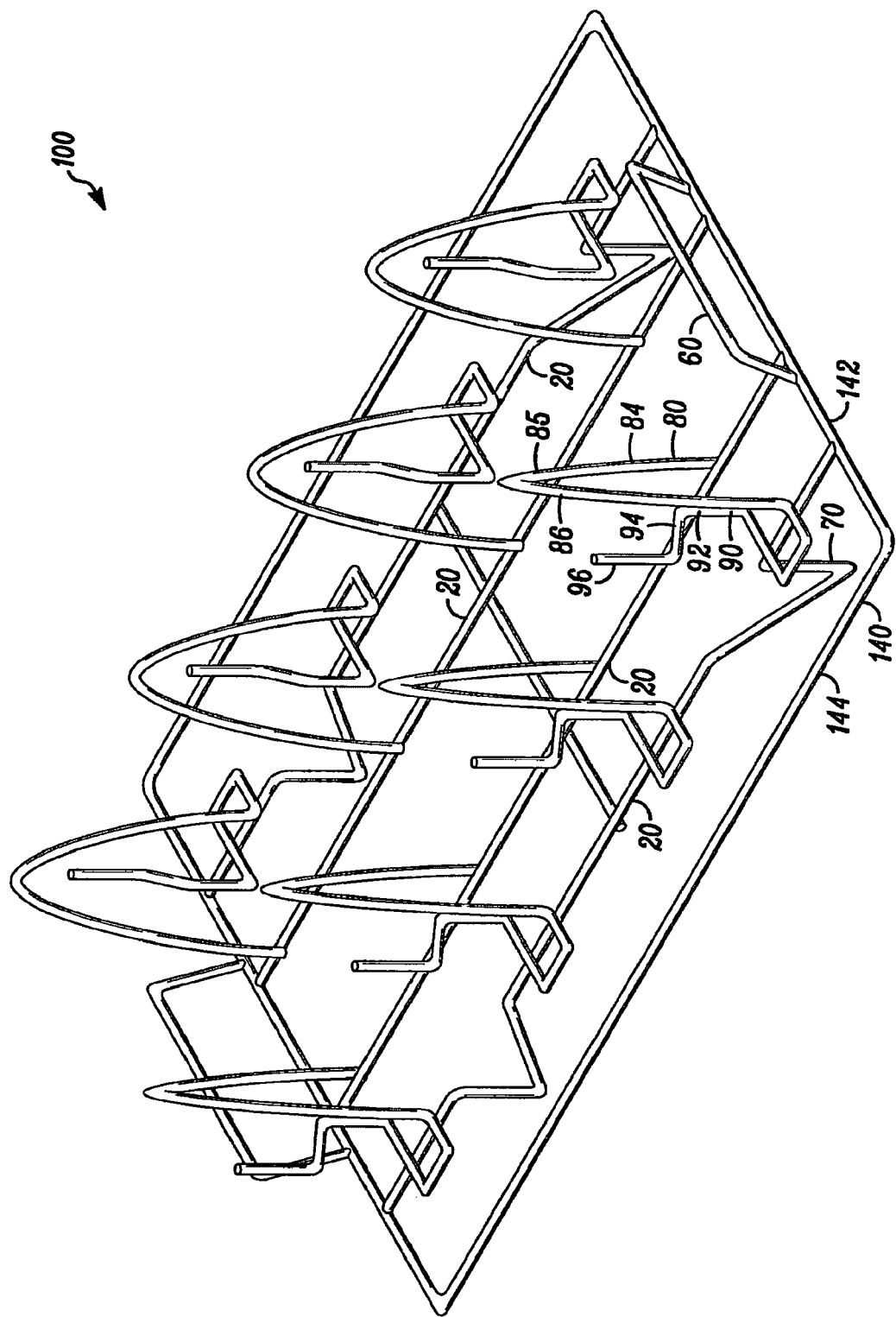
FIG. 8 is a perspective view of another baking rack.
Figure 9:
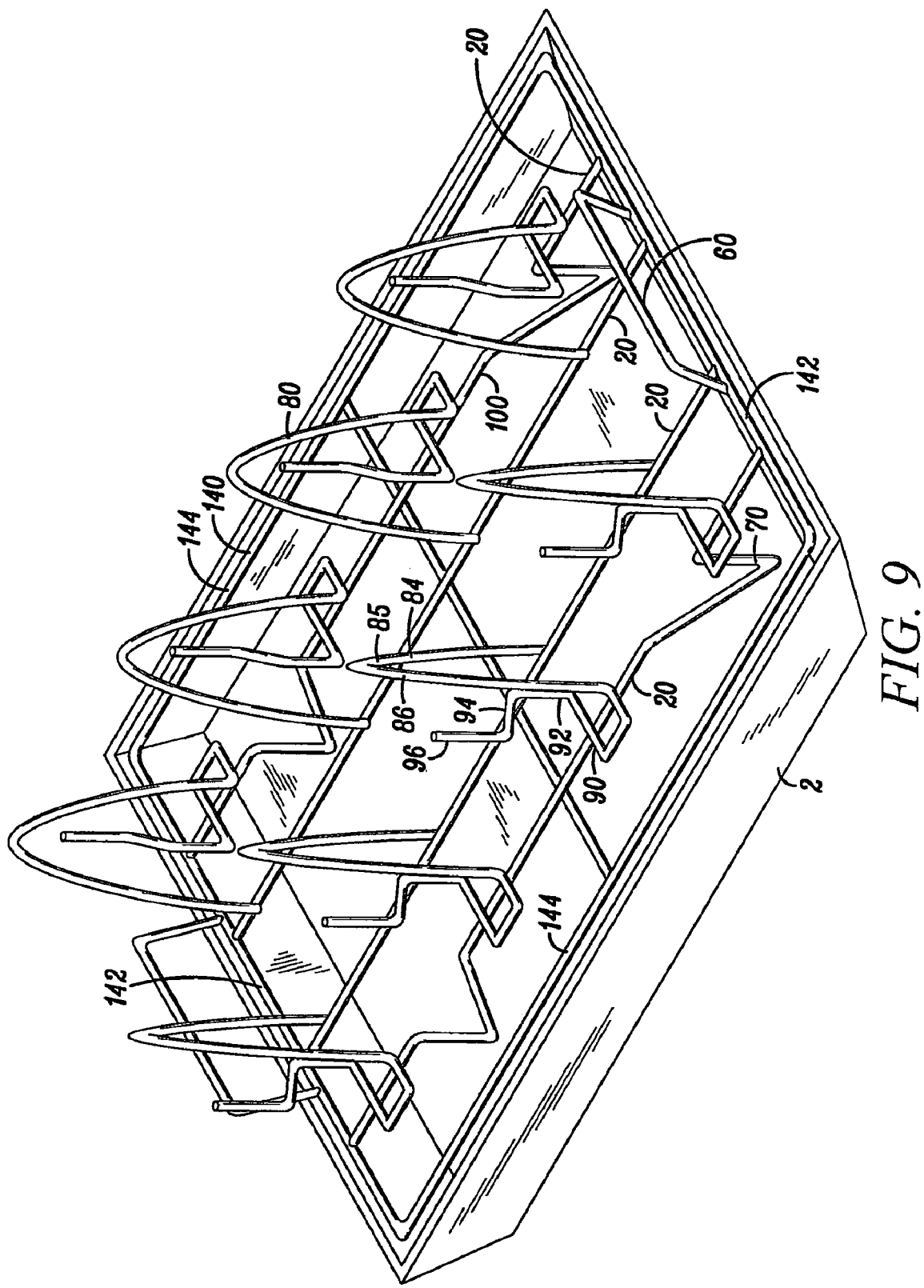
FIG. 9 is a perspective view of the baking rack of FIG. 8 disposed within a hotel pan.
Figure 10:
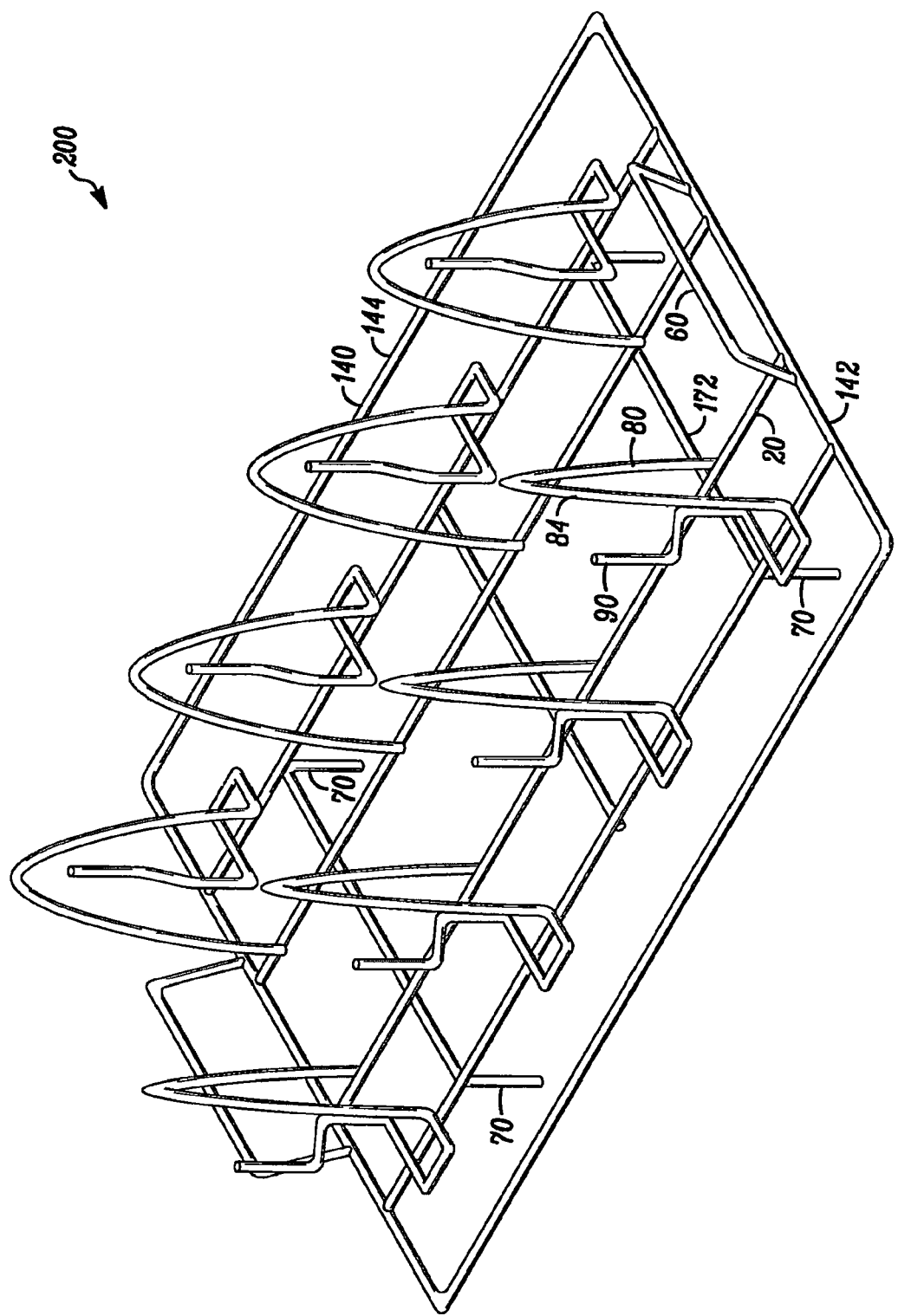
FIG. 10 is a perspective view of another baking rack.

In other embodiments, the rack 10 may have widths (the distance between the side wires 44 parallel to the horizontal wires 20) of about 9, 10, 11, or just below 12 inches such that the side wires 44 of the outer wire 40 contact (or are closely aligned with) the long side surfaces of the hotel pan 2 receiving the rack 10. As shown in FIGS. 8-9, an alternate rack 100 may be provided that is of a width just less than the width of a conventional hotel pan 2, such that the side wires 144 of the outer wire 140 of the rack 100 contact the side edges of the pan 2 for support. The rack 100 may include three or more wires 20 to minimize the space between neighboring wires 20 for structural support and to maintain the spacing used in rack 10 for use of the same design upstanding member 80 as discussed herein. Other than the extra wire 20, the rack 100 may be configured like rack 10 discussed herein.

The rack 10 includes two or more, and in some embodiments, four or more height stabilizing members 70 that extend downwards from the outer wire 40 and/or the horizontal wires 20 and establish a set off height between the plane X and the surface upon which the height stabilizing members 70 rest. In some embodiments, the rack 10 includes four height stabilizing members 70 each disposed proximate to the four corners of the rack 10. In some embodiments, the rack 10 may include one or more height stabilizing members 70 that extend from a central portion of the rack 10, for example from a central portion 25 of one or more of the horizontal wires 20. In some embodiments, the one of the straight wires 20 may include two height stabilizing members 70 monolithically formed thereon. In some embodiments, two of the straight wires 20 may each include two height stabilizing members 70 monolithically formed thereon.

As shown in an alternate embodiment of the rack 200, the height stabilizing members 70 may be a leg or similar member that extends substantially perpendicularly downward from the outer wire 40 (or horizontal wire 20) and establishes a set off height between the horizontal wires 20 and remainder of the rack 10 and the bottom surface of the restaurant pan 2 when the rack 10 is disposed thereupon. In other embodiments shown in FIGS. 1, 2, and 4, the height stabilizing members 70 may include two or more legs 71, 72 that each connect with, and may be monolithically formed with, one of a horizontal wire 20 or outer wire 40 (or each connect with different horizontal wires 20 or the outer wire 40) at a joint that also contacts the bottom of the pan 2 or other surface that the rack 10 rests upon. In some embodiments, the first and second legs 71, 72 may each extend downward from the wires 20, 40 at an oblique (which may be an acute or obtuse) angle to the plane X, or in other embodiments, one of the wires 72 may extend substantially perpendicularly from the plane X, with the other of the wires 71 extending at an oblique angle to the plane X and with an oblique or perpendicular angle with respect to the first wire 72. One or more, or each, of the height stabilizing members may be monolithically formed upon their respective straight wire 20 or outer wire 40 such that the transitions between the portions of the wires 20, 40 parallel with the plane X and the portion of the wires 20, 40 defining the height stabilizing members 70 are defined by substantially continuous curves that do not form any edges, verticies, or discontinuities.

Figure 2:
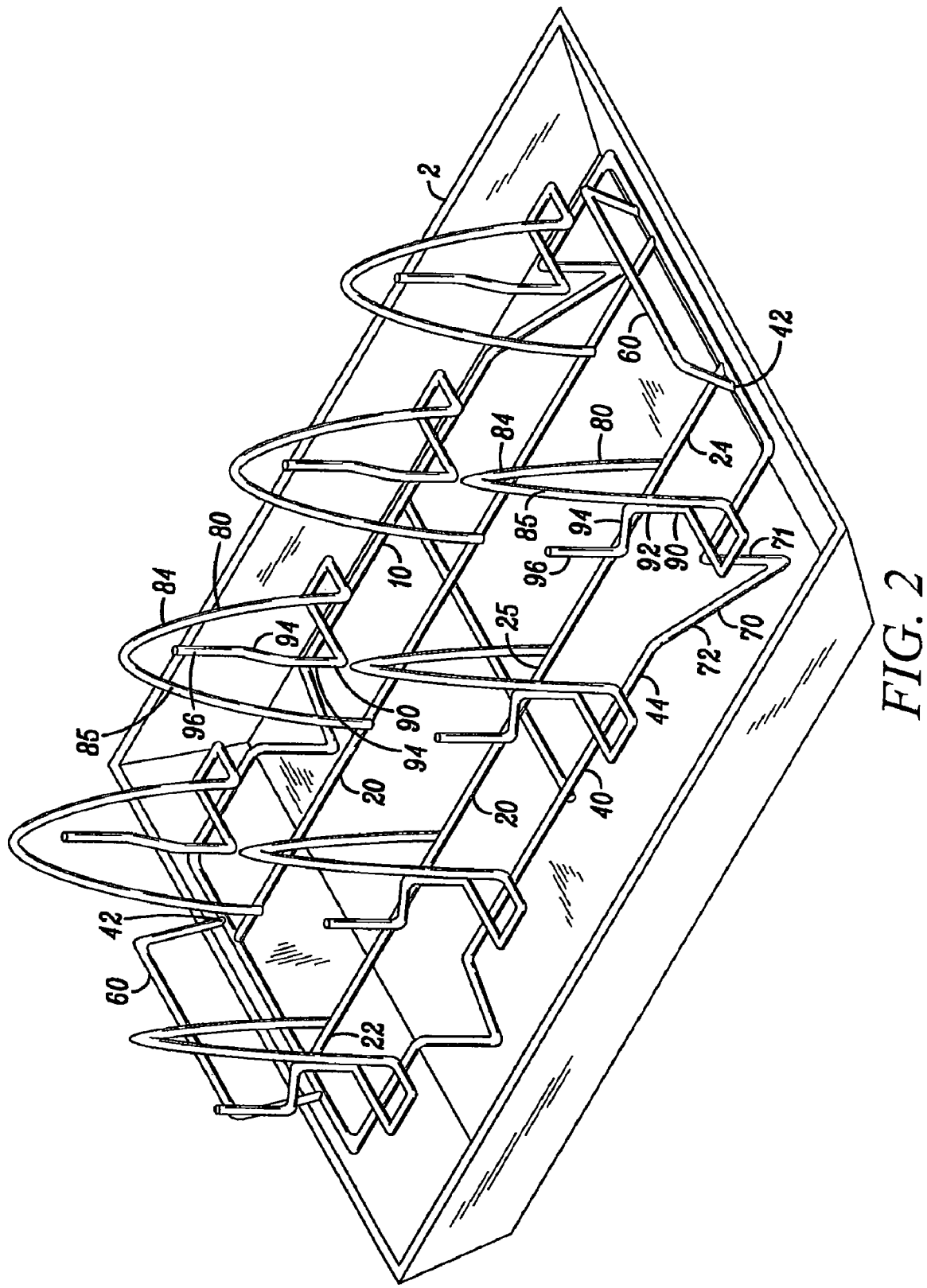
FIG. 2 is the rack of FIG. 1 disposed within a hotel pan.
Figure 5:
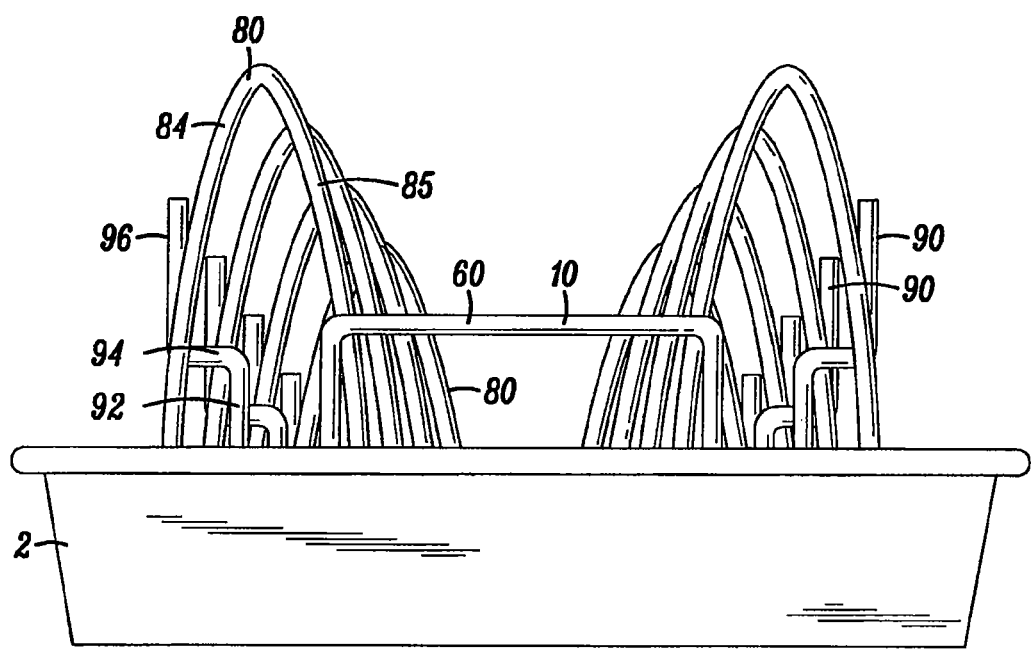
FIG. 5 front view of the rack of FIG. 1 disposed within a hotel pan.
Figure 6:
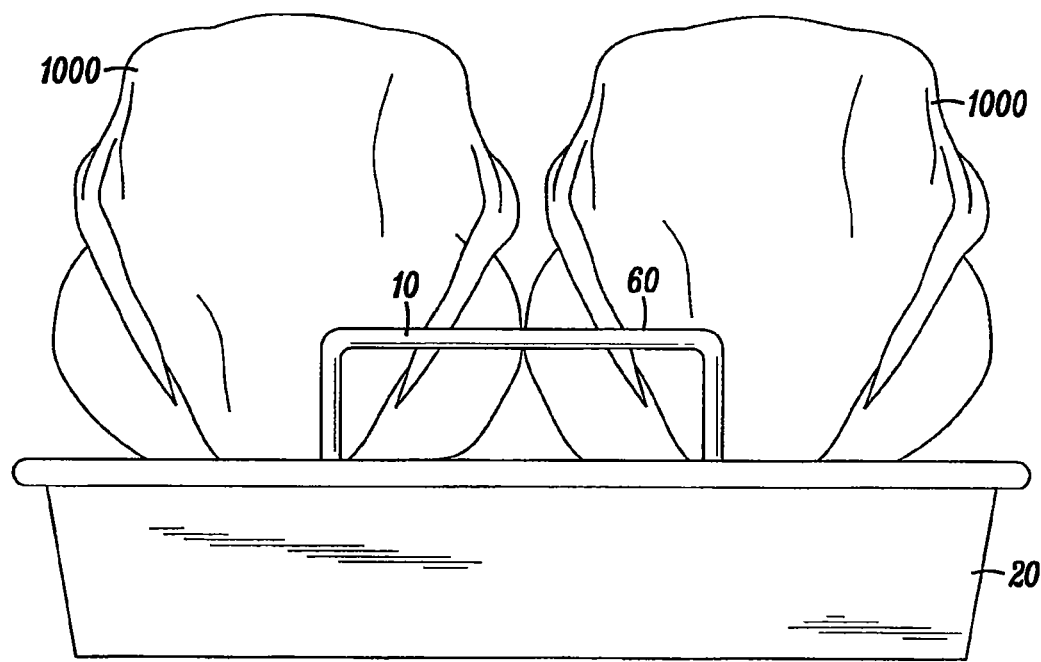
FIG. 6 is the view of FIG. 5 with a plurality of chickens disposed upon the upstanding members of the rack.

In some embodiments, the outer wire 40 itself may define some or all of the height stabilizing members 70. As shown in FIGS. 1, 2, and 4, the outer wires 44 may include straight portions that run parallel with the horizontal wires 20, and additionally include the first and second legs 71, 72 of the height stabilizing members 70, such that there is a discontinuity in the outer wire 40 through the plane X. The configuration where the outer wire 40 also continuously and monolithically forms the plurality of height stabilization members 70, in some embodiments four height stabilization members 70, allows the manufacturing of the rack 10 to be simplified and minimize the number of welded (or otherwise fixed) joints within the rack 10.

The rack 10 further includes a plurality of upstanding members 80 that each extend substantially perpendicularly upward from the plane X, in the direction opposite from the plurality of height stabilizing members 70. The upstanding members 80 each include a first arched portion 84 that is shaped similar to an upside down "U," and a second upstanding stick 90 spaced from the arched portion 84. In some embodiments, the rack 10 includes eight upstanding members 80 that are aligned in two parallel rows of four upstanding members 80 each. The positioning of the eight upstanding members 80 has been found to maximize the number of conventionally sized chickens or other fowl that may be placed upon the rack 10, while maintaining the chickens disposed above the hotel pan 2 to allow the pan to catch a significant portion of the drippings from the chicken during the cooking process, as shown schematically in FIG. 7.

The arched portion 84 includes two legs 85, 86 that are connected to two different horizontal wires 20 or to a horizontal wire 20 and a side portion 44 of the outer wire 40. The arched portion 84 is configured to extend within the internal cavity of a chicken disposed thereon to support the chicken upon the upstanding member upon the rack 10. In some embodiments, the arched portion 84 may extend about 5 inches above the horizontal wires 20, and in the embodiment shown in FIGS. 1-7, the arched portion 84 extends 5⁵⁄₁₆ inches above the horizontal wires. This height has been found to be sufficient to properly support the chicken placed thereon for a range of different size chickens that are typically used within the restaurant industry. Alternatively, the arched portion 84 may be various heights between about 3 inches and 7 inches for racks 10 configured to receive either small or large sized chickens supported thereon.

Figure 7:
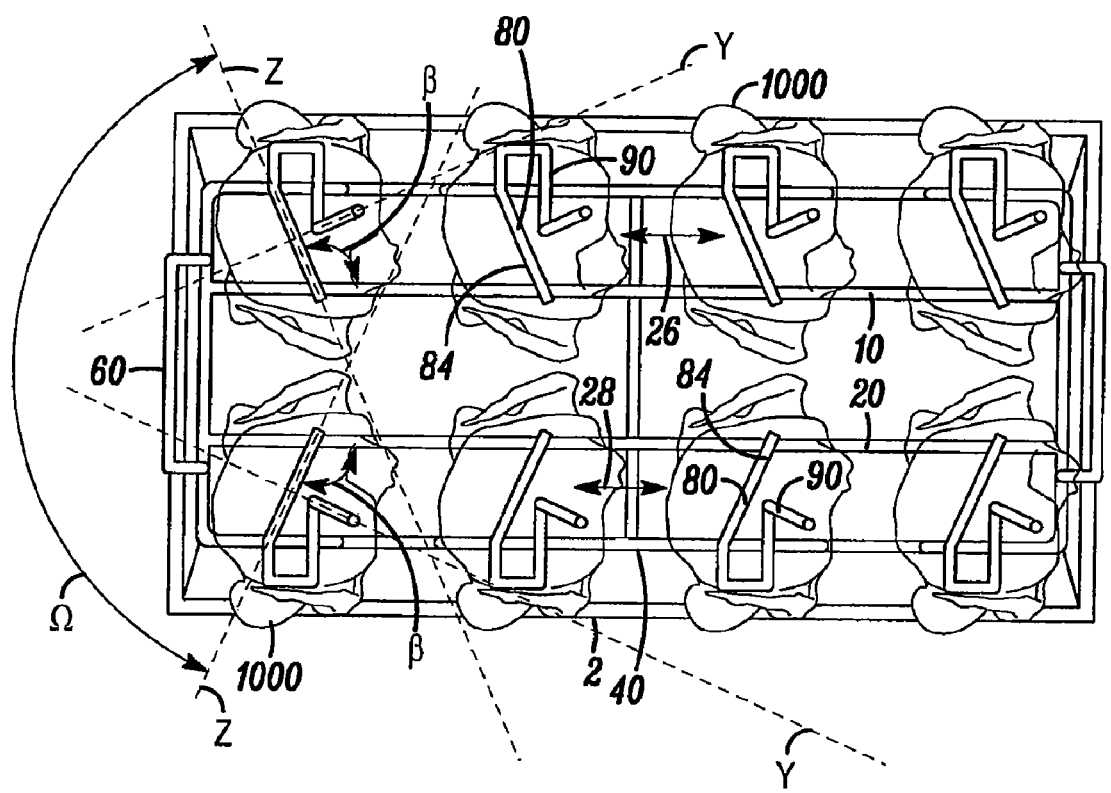
FIG. 7 a top view of the rack disposed within the hotel pan and showing schematically whole chickens disposed upon the upstanding members of the rack

The upstanding members 80 each additionally include an upstanding stick 90 that extends upward from one of the horizontal wires 20 or outer wire 40 proximate to the upstanding arched portion 84. The upstanding stick 90 may be a single straight portion, or in other embodiments shown in FIGS. 1-10, the upstanding member 90 may include multiple sections, such as a vertical lower section 92, a horizontal mid section 94, and a vertical upper section 96. As shown in FIG. 7, the lower and upper sections 92, 96 may each be disposed along a plane Y substantially perpendicular to the plane X and a line Z through the two legs 85, 86 of the arched portion 80. The lower and upper sections 92, 96 are spaced apart a distance equal to the length of the mid section 94.

The arched portion 84 and the upstanding stick 90 are configured such that the upstanding member 80 stability supports a chicken placed thereon, with the arched portion 84 and the upper section 96 of the upstanding stick 90 each contacting opposite inner surfaces of the internal cavity that receives the upstanding member 80. In some embodiments, the upstanding member 80 is configured to support the chicken with the arched portion 84 contacting the rear surface of the cavity, and the upper portion 96 of the stick 90 contacting the forward surface of the cavity (i.e. the inner surface of the breast side of the cavity). The spacing between the arched portion 84 and the stick 90 is established to allow a range of chickens to be supported by the upstanding member 80, and specifically the range of chickens suitable to be held by the rack 10 when each upstanding member 80 supports a chicken.

The upstanding members 80 may be made from a single wire that is bent into the required shape of the upstanding member and then welded or otherwise fixed to the horizontal and outer wires 20, 40 of the rack 10. In some embodiments, the upstanding arched portion 84 is oriented such that a plane Z (FIG. 7) through the arched portion 84 is orientated at an obtuse angle $\beta$ with respect to the horizontal wire 20 that is connected the leg of the arched portion 84. For example, in some embodiments where the upstanding members 80 are organized into two rows that extend in parallel to the horizontal wires 20, the upper row 26 (when viewed from above in the alignment of FIG. 7) of upstanding members 80 each have arched portions 84 that are oriented in parallel to each other, while the upstanding members 80 from the lower row 28 (as shown in FIG. 7) also are all aligned in parallel to each other. In some embodiments, the arched portions 84 of the upstanding members 80 of opposite rows are disposed at an equal and opposite angle β with respect to the horizontal wire 20. Further, as shown in FIG. 7, a plane Y through the horizontal portion 94 of the upstanding stick 90 and perpendicular to the plane Z through the first and second wires 85, 86 of the arched portion 84 extends through the neighboring portion of the outer wire 40 in each row 26, 28. This orientation where the arched portions 84 in each of the two rows are oriented at the same but opposite angle β maximizes the size and number of chickens that can be place upon the rack 10, as shown schematically in FIG. 7. In some embodiments, the angle β is approximately 110 degrees, while in other embodiments the angle may be 100, 120 or other similar obtuse angle.

As shown in FIG. 7, in some embodiments, the planes Z extending through the arched portions 84 of the upstanding members 80 from each of the two parallel rows 26, 28 may be aligned at an oblique or perpendicular angle Ω to each other. The angle Ω may be about 140 degrees (i.e. when both angles β are 110 degrees) or at an angle within the range of about 75 degrees to about 170 degrees.

The rack 10 may include two handles 60 that each extend from the first portions 42 of the outer wire 40. The handles 60 extend at an obtuse angle α from the plane X through the horizontal wires 20 and the outer wire 40. In some embodiments, the angle α may be about 110 degrees, which is the same or very close to the angles that the side walls of the hotel pan form with respect to the bottom surface of a hotel pan 2. The handles 60 allow easy and convenient manipulation of the rack 10 when it is disposed within the hotel pan 2 without unnecessarily minimizing the size of the rack 10 for use with the pan 2.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

What is claimed is:

1. A baking rack, comprising:
    a plurality of straight wires disposed in a substantially planar manner at spaced intervals therebetween;
    an outer wire disposed around a perimeter established by opposite ends of the plurality of straight wires;
    a plurality of height stabilizing members connected to two or more of the straight wires or the outer wire, such that a plane extending through each of the straight wires and the outer wire is disposed above a surface upon which bottom ends of the height stabilizing member rest;
    first and second handles disposed upon the outer wire proximate to opposite ends of the straight wires;
    a plurality of upstanding members disposed upon the straight wires that are configured to extend into the cavity of a fowl placed thereon, wherein the plurality of upstanding members each include an arched shaped portion and an upstanding stick, wherein the arched shaped portion is disposed along a vertical plane disposed at an acute angle to a line parallel with the plurality of straight wires, and
    the plurality of upstanding members comprise a first set of upstanding members disposed in a row and a second set of longitudinally aligned upstanding members disposed in a second row, wherein the arched shaped portions from each of the first set of upstanding members are disposed at an oblique angle with respect to the arched shaped portions from each of the second set of upstanding members,
    wherein the outer wire is configured to just fit within and contact inner surfaces of each of side walls defining a conventional hotel pan.

2. The baking rack of claim 1, wherein the height stabilizing members are configured to set off the plane a distance from a bottom surface of the hotel pan substantially equal to a height of each of the side walls of the pan.

3. A baking rack, comprising:
    a plurality of straight wires disposed in a substantially planar manner at spaced intervals therebetween;
    an outer wire disposed around a perimeter established by opposite ends of the plurality of straight wires;
    a plurality of height stabilizing members connected to two or more of the straight wires or the outer wire, such that a plane extending through each of the straight wires and the outer wire is disposed above a surface upon which bottom ends of the height stabilizing member rest;
    first and second handles disposed upon the outer wire proximate to opposite ends of the straight wires;
    a plurality of upstanding members disposed upon the straight wires that are configured to extend into the cavity of a fowl placed thereon, wherein the plurality of upstanding members each include an arched shaped portion and an upstanding stick, wherein the arched shaped portion is disposed along a vertical plane disposed at an acute angle to a line parallel with the plurality of straight wires,
    wherein the arched shaped portion includes two legs with a first of the two legs fixed to one of the straight wires and a second of the two legs is fixed to the outer wire.

4. The baking rack of claim 1, wherein each of the first and second handles extend outward from the outer wire at an acute angle with respect to the plane.

5. The baking rack of claim 1, wherein at least one of the plurality of height stabilizing members includes a first portion substantially perpendicular to the plane, and a second portion connected with the first portion and disposed at an oblique or perpendicular angle with respect to the first member and another oblique or perpendicular angle with respect to the plane, wherein the first and second portions are connected to the respective straight wire or outer wire with substantially continuous curves.

6. The baking rack of claim 1, wherein at least one of the plurality of height stabilizing members includes a first portion that is disposed at an acute angle with respect to the plane.

7. The baking rack of claim 1, wherein at least one of the plurality of height stabilizing members is configured as a continuous portion of a respective one of the plurality of straight wires or the outer wire, wherein the at least one of the plurality of height stabilizing members includes a first portion that is disposed at an acute angle with respect to the plane and a second member with a first end connected to an end of the first member and an opposite second end that reaches the plane.

8. The baking rack of claim 7, wherein each of the plurality of height stabilizing members are defined monolithically with the respective straight wire or outer wire that they are a portion of.

9. The baking rack of claim 7, wherein one of the plurality of straight wires includes two height stabilizing members monolithically formed thereon.

10. The baking rack of claim 7, wherein the outer wire includes four height stabilizing members monolithically formed therewith.

11. The baking rack of claim 1, wherein a first line extending in parallel with the plane and perpendicular to a second plane through the arched shaped portion of one of the upstanding members of the first set extends across the portion of the outer wire connected to the respective arched shaped portion, wherein a second line extending in parallel with the plane and perpendicular to a third plane through the arched shaped portion of the upstanding member of the second set extends across the portion of the outer wire connected to the respective arched shaped portion.

12. The baking rack of claim 1, wherein the upstanding stick comprises a first horizontal portion connected to one of the straight wires or the outer wire, a first upstanding portion extending from an end of the first horizontal portion, a second horizontal portion extending from an opposite end of the first upstanding portion, and a second vertical portion extending from an opposite end of the first horizontal portion.

13. A baking rack configured to hold a plurality of upstanding fowl, comprising:
  a plurality of relatively straight wires each disposed in parallel to each other and an outer wire establishing a perimeter of the rack and extending along opposing ends of the plurality of wires, the straight wires and the outer wire each disposed within a plane;
  a plurality of height stabilizing members connected to two or more of the straight wires or the outer wire, such that the plane is disposed above a surface upon which bottom portions of the height stabilizing members rest;
  a plurality of upstanding members extending from the plane, the upstanding members each connected to one or more of the straight wires and the outer wire, the upstanding members each comprising an arched portion and an upstanding stick, wherein a second plane disposed through the arched portion of each upstanding member is at an acute angle with a line parallel to the straight wires, and
  wherein the upstanding stick comprises a first horizontal portion connected to one of the straight wires or the outer wire, a first vertical portion extending substantially perpendicularly upward from the first vertical portion, a second horizontal portion extending through a third plane parallel to the plane and at a substantial perpendicular angle to the second plane, and a second vertical portion substantially parallel to the first vertical portion.

14. The baking rack of claim 13, wherein a portion of the plurality of upstanding members define a first set aligned in a first row in contact with one of the straight wires, and another portion of the plurality of upstanding members defined in a second row in contact with another of the straight wires.

* * * * *